United States Patent [19]

Coran et al.

[11] 4,350,740

[45] Sep. 21, 1982

[54] MODIFIED OLEFIN POLYMERS

[75] Inventors: Aubert Y. Coran; Raman Patel, both of Akron, Ohio

[73] Assignee: Monsanto Company, St. Louis, Mo.

[21] Appl. No.: 297,449

[22] Filed: Aug. 28, 1981

Related U.S. Application Data

[62] Division of Ser. No. 128,611, Mar. 10, 1980, abandoned.

[51] Int. Cl.$^3$ .............................................. C08F 8/30
[52] U.S. Cl. ................................... 428/461; 428/516; 428/344; 525/296; 525/374; 156/331.6
[58] Field of Search .................. 428/461, 516, 355; 525/335, 374, 296

[56] References Cited

U.S. PATENT DOCUMENTS

| | | | |
|---|---|---|---|
| 3,131,990 | 5/1964 | Benvicini et al. | 8/115.5 |
| 3,483,276 | 12/1969 | Mahlman | 260/897 |
| 3,502,542 | 3/1970 | Wenisch | 161/216 |
| 3,987,122 | 10/1976 | Bartz et al. | 260/836 |
| 4,129,472 | 12/1978 | Hobes et al. | 156/331 |
| 4,198,327 | 4/1980 | Matsumoto et al. | 260/4 |
| 4,278,586 | 7/1981 | Marzola et al. | 260/42.18 |

FOREIGN PATENT DOCUMENTS 880596 3/1960 United Kingdom .

*Primary Examiner*—George F. Lesmes
*Assistant Examiner*—E. Rollins Buffalow
*Attorney, Agent, or Firm*—Larry R. Swaney

[57] ABSTRACT

Olefin polymers modified with substituted maleamic acids are described which modified polymers are useful as metal adhesives.

10 Claims, No Drawings

MODIFIED OLEFIN POLYMERS

This is a division of application Ser. No. 128,611, filed Mar. 10, 1980 now abandoned.

This application relates to improved olefin polymers, in particular, olefin polymers modified with maleamic acid derivatives. It also relates to bonded structures of metal and polymeric material.

BACKGROUND OF THE INVENTION

Modification of olefin polymers with unsaturated carboxylic acid produces polymer compositions exhibiting superior adhesion to various substrates, for example, U.S. Pat. Nos. 3,483,276 and 3,987,122. The improvement of adhesion of elastomers to metal when the elastomer is cured using a free radical curing system in the presence of N-maleamic acids or N-maleimide compounds is also known, U.S. Pat. No. 3,502,542. However, to realize the full potential for articles of polymeric material bonded to metal, improved adhesion is needed.

SUMMARY OF THE INVENTION

It has now been discovered that an alpha monoolefin polymer modified by causing it to react with a substituted maleamic acid, results in a polymer composition exhibiting superior adhesion, especially, to metal substrates. The modified monoolefin polymer of the invention comprises the reaction product of an olefin polymer, preferably a thermoplastic olefin polymer, and about 0.1 to about 20 weight percent of a substituted maleamic acid of the formula:

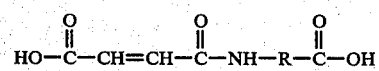  (a)

in which R is a straight or branched alkylene radical of 1-18 carbon atoms, or

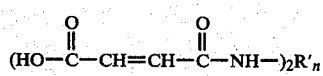  (b)

in which n is zero or one, and R' is a straight or branched alkylene radical of 2-18 carbon atoms or arylene of 1-12 carbon atoms. Suitable arylene radicals include phenylene and phenylene substituted by lower alkyl, lower alkoxy or halo, preferably chloro. Lower alkyl is an alkyl radical of 1-6 carbon atoms. Alkylene radicals of up to 12 carbon atoms are preferred.

The modified olefin polymers of the invention may be conveniently prepared by melt mixing olefin polymer with substituted maleamic acid, preferably in the presence of a radical generator. Conventional plastic masticating equipment such as a mill, Banbury mixer, or twin screw mixing extruder may be used to mix the ingredients and to affect reaction. Depending upon the temperature, the type of olefin polymer, substituted maleamic acid and radical generator, mixing times of about 1-30 minutes are generally adequate to essentially complete the reaction. Preferably, the ingredients are caused to react at a temperature above the melting point of the olefin polymer. To promote reaction, a (free) radical generator such as a peroxide is generally present in amounts of about 0.1 to 50 parts per weight per 100 parts by weight of substituted maleamic acid. The amount of radical generator is kept to a minimum to avoid excessive cross-linking of the olefin polymer or, in the case of branched olefin polymers such as polypropylene, to avoid excessive degradation of the polymer. Generally, the amount of radical generator is 5 parts or less, preferably one part or less, by weight per 100 parts by weight of olefin polymer. Preferred modified polymers of the invention comprise the reaction products of olefin polymer and about 0.2 to about 10 percent by weight of the substituted maleamic acid.

Suitable olefin polymers comprise amorphous or crystalline essentially saturated homopolymers or copolymers of $C_2$-$C_8$ alpha monoolefins. Thermoplastic crystalline olefin polymers are especially preferred. An important subgroup of satisfactory olefin polymers comprises high molecular weight solid products from the polymerization of monoolefins or mixtures thereof by either high pressure or low pressure processes. Examples of such polymers are the isotactic or syndiotactic monoolefin polymers, representative members of which are commonly available. Satisfactory olefins include ethylene, propylene, 1-butene, 1-pentene, 1-hexene, 2-methyl-1-propene, 3-methyl-1-pentene, 4-methyl-1-pentene, 5-methyl-1-hexene, and mixtures thereof. Commercially available thermoplastic polyolefin resins, such as, polyethylene, polybutene-1, and polypropylene, or mixtures thereof, may be advantageously used in the practice of the invention with polypropylene being preferred. Also suitable for the practice of the invention are copolymers of two or more olefins with copolymers of ethylene and propylene being preferred.

The substituted maleamic acids useful for preparing modified monoolefin polymers of the invention may be named as derivatives of 4-oxo-2-butenoic acid, i.e., 4-(carboxyalkylamino)-4-oxo-2-butenoic acid and 4,4'-(alkanediyldiamino or phenylenediamino)bis-4-oxo-2-butenoic acid. 4,4'-(Hydrazo)bis-4-oxo-2-butenoic acid may also be used to prepare modified polymer. However, for convenience, they shall be named herein as derivatives of maleamic acid.

Examples of substituted maleamic acids of Formula (a) suitable for the practice of this invention are:
N-(carboxymethyl)maleamic acid
N-(2-carboxyethyl)maleamic acid
N-(2-carboxypropyl)maleamic acid
N-(3-carboxypropyl)maleamic acid
N-(2-carboxybutyl)maleamic acid
N-(3-carboxybutyl)maleamic acid
N-(4-carboxybutyl)maleamic acid
N-(5-carboxypentyl)maleamic acid
N-(6-carboxyhexyl)maleamic acid
N-(7-carboxyhepyl)maleamic acid
N-(8-carboxyoctyl)maleamic acid
N-(4-carboxy-1,1,3,3-tetramethylbutyl)maleamic acid
N-(10-carboxydecyl)maleamic acid
N-(12-carboxydodecyl)maleamic acid
N-(15-carboxypentadecyl)maleamic acid
N-(18-carboxyoctadecyl)maleamic acid Examples of substituted maleamic acids of Formula (b) suitable for the practice of this invention are:
N,N'-dimaleamic acid
N,N'-(dimethylene)dimaleamic acid
N,N'-(1-methyl-1,2-ethanediyl)dimaleamic acid
N,N'-(trimethylene)dimaleamic acid
N,N'-(1-methyl-1,3-propanediyl)dimaleamic acid
N,N'-(tetramethylene)dimaleamic acid
N,N'-(2,2-dimethyl-1,3-propanediyl)dimaleamic acid
N,N'-(pentamethylene)dimaleamic acid N,N'-(hexamethylene)dimaleamic acid
N,N'-(heptamethylene)dimaleamic acid
N,N'-(octamethylene)dimaleamic acid
N,N'-(decamethylene)dimaleamic acid
N,N'-(dodecamethylene)dimaleamic acid
N,N'-(pentadecamethylene)dimaleamic acid
N,N'-(octadecylmethylene)dimaleamic acid
N,N'-(1,2-phenylene)dimaleamic acid
N,N'-(1,3-phenylene)dimaleamic acid
N,N'-(1,4-phenylene)dimaleamic acid
N,N'-(4-methyl-1,2-phenylene)dimaleamic acid
N,N'-(5-methyl-1,3-phenylene)dimaleamic acid
N,N'-(5-methoxy-1,3-phenylene)dimaleamic acid
N,N'-(2-chloro-1,4-phenylene)dimaleamic acid
N,N'-(5-tert-butyl-1,3-phenylene)dimaleamic acid
N,N'-(1,2-naphthylene)dimaleamic acid Any radical generator which promotes the reaction between olefin polymer and substituted maleamic acid is satisfactory for the practice of the invention. Suitable radical generators include azides and inorganic or organic peroxides. Examples of satisfactory radical generators are dicumyl peroxide, benzoyl peroxide, 2,5-dimethyl-2,5-bis(t-butylperoxy)hexane, 1,1-bis(t-butylperoxy)-3,3,5-trimethyl cyclohexane, tris-[α,α-dimethyl-α-(t-butylperoxy) methyl]benzene, di-t-butyl peroxide, lauroyl peroxide, cumene hydroperoxide, t-butyl hydroperoxide, α,α'-bis(t-butylperoxy)hexane, pinane hydroperoxide, p-menthane hydroperoxide and azobisisobutyronitrile.

One embodiment of the invention comprises reinforced structures comprising a metal member and polymeric material bonded thereto. Enhanced adhesion between the metal and polymeric material is achieved by providing at the interface between the metal member and the polymeric material an adhesion enhancing amount of the modified polymer of this invention. The modified olefin polymer of the invention may be applied in the same manner as conventional adhesives, for example, as hot-melt adhesives by direct contact above the softening or melting temperature of the modified polymer or polymeric material containing modified polymer. Thus, the modified polymer can migrate to the interface to form a bond upon cooling. Alternately, the modified polymer may be applied to the surface as a solution or suspension followed by evaporation of the solvent. Any amount of modified olefin polymer which increases the adhesion between the metal and the polymeric material is satisfactory for making the improved structures of the invention. The amount required varies depending upon the type of metal and type of polymeric material involved. However, the amount is readily ascertained by trial within the skill of the art. The amount is incrementally increased until sufficient adhesion is achieved. It is understood that reinforced structures of the invention include composites, laminates and articles in which the metal member is in the form of a sheet or continuous or discontinuous fiber. The term "polymeric material" includes any unchanged olefin polymer remaining after a portion of the olefin polymer has been modified by reaction with substituted maleamic acid.

Polymeric material other than olefin polymer suitable for making bonded metal structures include any polymer which the modified olefin polymer of the invention will adhere to metal. Examples of satisfactory polymeric materials include nylons, polyesters, polyurethanes, styrene-acrylonitrile resins, polystyrene, ABS resins, and cured or uncured rubber. Preferred polymeric materials comprise olefin polymers especially polyethylene and polypropylene, and their blends with cured or uncured rubber.

Any metal member is suitable for making structures of the invention but particularly suited are those metals exhibiting a valence state of two or more and a melting temperature above 200° C. Preferred metal members are selected from the group consisting of iron, aluminum, zinc, copper, and their alloys, such as brass and steel, with aluminum being especially preferred.

It is generally required that the adhesive layer, the bonding surface of the metal substrate and the other substrate, if present, be heated above the melting or softening temperature of the adhesive.

DESCRIPTION OF THE PREFERRED EMBODIMENTS

Polypropylene is modified by the action of a substituted maleamic acid in the presence of a free radical generator. For example, one hundred parts by weight of polypropylene (Profax 6723, melt flow 0.8, ASTM D-1238, cond. L) and 5 parts by weight of the indicated reactants are masticated at 80 rpm in a Brabender mixer at about 180° C. After a homogeneous mixture is obtained, 0.56 parts by weight of a radical generator, 2,5-dimethyl-2,5-bis(t-butylperoxy)hexane, Lupersol-101, is added and mixing is continued for about 5 minutes. The modified polypropylene is removed, cooled in a press and evaluated as a hot-melt adhesive either neat or blended with other materials.

A reinforced structure is formed by bonding two 5 mil. thick aluminum sheets (5"×5" square) together with about 1 gram of modified polypropylene or blend thereof. An aluminum sandwich comprising the two aluminum sheets bonded by the modified polypropylene is formed by pressing, at 210° C. and at a pressure sufficient to give a polymeric interlayer about 5 mils thick. The sandwich is cut into one inch strips. The force required to pull the two aluminum strips apart at 180° is measured with a tensile tester using a separation speed of 10 inches per minute. The adhesion values are recorded in pounds per linear inch, pli. The adhesion of aluminum to neat modified-polymer designated modified PP and to a blend with thermoplastic elastomeric composition designated TE/PP blend is evaluated.

The thermoplastic elastomeric composition is prepared by dynamic vulcanization as described in U.S. Pat. No. 4,130,535, except part of the polypropylene is replaced by modified polypropylene and a phenolic curative is used. The thermoplastic elastomeric composition comprises (all parts by weight) 50 parts of EPDM rubber (Epsyn 70A), 37.5 parts of polypropylene (Profax 6723), and 12.5 parts of modified polypropylene. Five parts of phenolic curing resin, SP-1056, and one part of cure activator, zinc oxide are used to cure the rubber.

The results are shown in Table 1. Stocks 1, 2, and 3 are controls where the reactants are maleic acid, maleic anhydride, and 1,3-phenylenebismaleimide, respectively. Stocks 4–7 illustrate polypropylene modified with dimaleamic acid derivatives. Stocks 8 and 9 illustrate polypropylene modified with N-carboxyalkyl maleamic acids. The data show that polypropylene modified with a dimaleamic acid derivative gives superior adhesion when used as a neat material and that polypropylene modified with an N-carboxyalkyl malemic acid gives superior adhesion in a thermoplastic elastomer blend. Stock 4 is repeated except only 2 parts, instead of 5 parts, or N,N'-(hexamethylene) dimaleamic acid is used with the polypropylene. The adhesion values are 6.7 pli for modified PP and 8.0 pli for the TE/PP blend.

Other modified polypropylene compositions are prepared and tested as in Table 1, except the polypropylene is Profax 6523 (melt index 4) and 1.48 parts of the radical generator are used. The results are shown in Table 2.

TABLE 1

| STOCK NO. | REACTANT | ADHESION TO ALUMINUM, pli | |
|---|---|---|---|
| | | MODIFIED PP | TE/PP BLEND |
| 1 | maleic acid | 0.5 | 6.0 |
| 2 | maleic anhydride | 2.5 | 7.8 |
| 3 | 1,3-phenylene bismaleimide | 0.24 | 0.4 |
| 4 | N,N'-(hexamethylene) dimaleamic acid | 6.0 | 8.5 |
| 5 | N,N'-(dodecamethylene) dimaleamic acid | 6.0 | 6.5 |
| 6 | N,N'-(1,4-phenylene) dimaleamic acid | 8.0 | 2.0 |
| 7 | N,N'-(1,3-phenylene) dimaleamic acid | 7.0 | 8.5 |
| 8 | N-(carboxymethyl) maleamic acid | 1.0 | 14.7 |
| 9 | N-(3-carboxypropyl) maleamic acid | 0.25 | 12.0 |

TABLE 2

| STOCK NO. | REACTANT | ALUMINUM ADHESION, pli TE/PP BLEND |
|---|---|---|
| 1 | N-(carboxymethyl)maleamic acid | 23.5 |
| 2 | N-(10-carboxydecyl)maleamic acid | 13.5 |

Enhancing adhesion by blending uncured rubber and modified polypropylene of the invention is illustrated in Table 3. The modified polypropylene is prepared with Profax 6523 polypropylene by the same procedure as above. In Stocks 1-5, five parts of N-(carboxymethyl)-maleamic acid (CMMA) and 1.48 parts of organic peroxide (L-101) are used per 100 parts of polypropylene. In Stocks 6-7, ten parts of N-(carboxymethyl)maleamic acid and 0.87 parts of organic peroxide (L-101) are used per 100 parts of polypropylene. In Stocks 8-11, there are brought into reaction, 5 parts of N,N-(hexamethylene) dimaleamic acid (HMDMA) and 0.56 parts of organic peroxide with 100 parts of polypropylene. In Stocks 12-13, 5 parts of N,N'-(1,4-phenylene)-dimaleamic acid (PDMA) and 0.56 parts of organic peroxide are used per 100 parts of polypropylene. The modified polypropylene is mixed with uncured EPDM rubber (ethylene-propylenenorbornene terpolymer, Epsyn 70A) in a Brabender mixer above the melting temperature of the polypropylene in the proportions indicated (all parts by weight). Aluminum sandwiches are prepared as above by pressing the adhesive compositions between pairs of heated sheets of aluminum foil. Adhesion is measured as before. The results show that the incorporation of uncured rubber into the modified-polypropylene substantially increases the adhesion to aluminum. The data further indicates that superior adhesion is achieved when the proportion of rubber is about 30 parts by weight per 100 parts by weight of polypropylene, modified polypropylene and uncured rubber combined.

TABLE 3

| STOCK NO. | MODI- FIER | (parts by weight) | | ALUMI- NUM ADHESION, pli |
|---|---|---|---|---|
| | | MODIFIED PP | EPDM RUBBER | |
| 1 | CMMA | 100 | — | <0.5 |
| 2 | CMMA | 80 | 20 | 3.5 |
| 3 | CMMA | 70 | 30 | 10.0 |
| 4 | CMMA | 40 | 60 | 8.5 |
| 5 | CMMA | 20 | 80 | 6.5 |
| 6 | CMMA | 100 | — | 9.0 |
| 7 | CMMA | 70* | 30 | 32.5 |
| 8 | HMDMA | 100 | — | 6.0 |
| 9 | HMDMA | 80 | 20 | 10.0 |
| 10 | HMDMA | 70 | 30 | 14.5 |
| 11 | HMDMA | 60 | 40 | 12.5 |
| 12 | PDMA | 100 | — | 11.0 |
| 13 | PDMA | 70 | 30 | 26.0 |

*Blend of 25 parts of modified PP and 75 parts of unmodified PP.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. In a structure comprising a metal member and a polymeric material bonded thereto, the improvement comprises, providing at the interface between the metal member and the polymeric material, an adhesive comprising an adhesion enhancing amount a modified olefin polymer comprising the reaction product of 100 parts by weight of monoolefin polymer and about 0.1 to about 20 parts by weight of substituted maleamic acid of the formulas

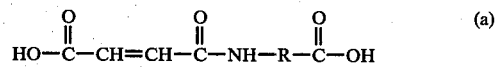

(a)

in which R is a straight or branched alkylene radical of 1-8 carbon atoms, or

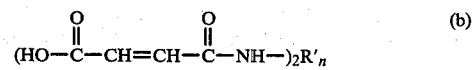

(b)

in which n is zero or one, and R' is a straight or branched alkylene radical of 2-18 carbon atoms or arylene of 6-12 carbon atoms.

2. The structure of claim 1 in which the metal member is iron, aluminum, zinc, copper, or alloys thereof.

3. The structure of claim 2 in which the polymeric material comprises olefin polymer.

4. The structure of claim 2 in which the polymeric material comprises rubber.

5. The structure of claim 4 in which the rubber is EPDM rubber.

6. The structure of claim 3 in which the olefin polymer is polypropylene.

7. The structure of claim 6 in which the metal is aluminum.

8. The structure of claim 4 in which the adhesive is the modified polymer comprising the reaction product of 100 parts by weight of monoolefin polymer and about 0.2 to about 10 parts by weight of a substituted maleamic acid of Formula (a) wherein R is an alkylene radical of 1–12 carbon atoms.

9. The structure of claim 2 in which the adhesive is the modified polymer comprising the reaction product of 100 parts by weight of monoolefin polymer and about 0.2 to about 10 parts by weight of a substituted maleamic acid of Formula (b) wherein n is one and R' is an alkylene radical of 2–12 carbon atoms.

10. The structure of claim 2 in which R' is phenylene.

* * * * *